United States Patent
Ringh et al.

(10) Patent No.: US 10,237,096 B2
(45) Date of Patent: Mar. 19, 2019

(54) PROCESSING OF A FASTER-THAN-NYQUIST SIGNALING RECEPTION SIGNAL

(71) Applicant: Telefonaktiebolaget LM Ericsson (publ), Stockholm (SE)

(72) Inventors: Emil Ringh, Stockholm (SE); Ather Gattami, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/550,204

(22) PCT Filed: Apr. 2, 2015

(86) PCT No.: PCT/EP2015/057371
§ 371 (c)(1),
(2) Date: Aug. 10, 2017

(87) PCT Pub. No.: WO2016/155838
PCT Pub. Date: Oct. 6, 2016

(65) Prior Publication Data
US 2018/0048496 A1     Feb. 15, 2018

(51) Int. Cl.
*H04L 25/03* (2006.01)
*H04L 25/497* (2006.01)
*H04B 7/0456* (2017.01)

(52) U.S. Cl.
CPC .. *H04L 25/03834* (2013.01); *H04L 25/03006* (2013.01); *H04L 25/03146* (2013.01); *H04L 25/497* (2013.01); *H04B 7/0456* (2013.01)

(58) Field of Classification Search
CPC ........... H04L 25/03834; H04L 27/2601; H04L 25/03006; H04L 25/497
See application file for complete search history.

(56) References Cited

U.S. PATENT DOCUMENTS

| | | | | |
|---|---|---|---|---|
| 2004/0101048 | A1* | 5/2004 | Paris | G10L 19/008 375/240.12 |
| 2007/0058757 | A1* | 3/2007 | Kusume | H04L 1/0631 375/340 |
| 2008/0317158 | A1* | 12/2008 | Ketchum | H04B 7/0417 375/267 |

OTHER PUBLICATIONS

Baek, Myung-Sun et al., "Novel Interference Cancellation Technique based on Matrix Computation for FTN Communication System," IEEE Military Communications Conference, Oct. 6-8, 2014, Baltimore, MD, USA, IEEE, pp. 830-834.

(Continued)

*Primary Examiner* — Kabir A Timory
(74) *Attorney, Agent, or Firm* — Withrow & Terranova, PLLC (57) ABSTRACT

There is provided mechanisms for processing a reception signal r. The method is performed by a receiver. The method comprises receiving a reception signal r representing a sequence of input symbols $x_n$, the reception signal comprising a sequence of pulse forms gT selected from a set of pulse forms. The method comprises generating a set of decoded symbols Formula (I) from the reception symbols by subjecting a set of sampled symbols $y_n$ derived from the reception signal to a whitening filter defined by second coefficients K, and to an equalizer defined by first coefficients R. The first coefficients R and the second coefficients K are selected from respective matrices of a Toeplitz decomposition of a Gram matrix G defined by the inner product of all pulses in the set of pulse forms.

$$\hat{x}_n \qquad (I)$$

31 Claims, 4 Drawing Sheets

(56) References Cited

OTHER PUBLICATIONS

El Hefnawy, Marwa et al., "Overview of Faster-Than-Nyquist for Future Mobile Communication Systems," IEEE 77th Vehicular Technology Conference (VTC Spring), Jun. 2-5, 2013, Dresden, Germany, IEEE, 5 pages.

Fischer, Robert et al., "Signal processing in decision-feedback equalization of intersymbol-interference and multiple-input/multiple-output channels: a unified view," Signal Processing, vol. 83, Issue 8, Aug. 2003, Elsevier Science B.V., pp. 1633-1642.

Golub, Gene et al., "Matrix Factorizations in Fixed Point on the C6x VLIW Architecture," TI report, Dec. 21, 1998, http://citeseerx.ist.psu.edu/viewdoc/summary?doi=10.1.1.17.3840, pp. 1-43.

Mazo, J. E., "Faster-than-nyquist signaling," The Bell System Technical Journal, vol. 54, Issue 8, Oct. 1975, American Telephone and Telegraph Compnay, pp. 1451-1462.

Prlja, Adnan et al., "Receivers for Faster-than-Nyquist Signaling with and without Turbo Equalization," IEEE International Symposium on Information Theory (ISIT), Jul. 6-11, 2008, Toronto, ON, Canada, IEEE, pp. 464-468.

Ringh, Emil, "Low complexity algorithms for faster-than-Nyquist signaling: Using coding to avoid an NP-hard problem," Master of Science Thesis, Royal Institute of Technology, 2013, Stockholm, Sweden, www.kth.se/sci, 82 pages.

Rusek, Fredrik et al., "Constrained Capacities for Faster-Than-Nyquist Signaling," IEEE Transactions on Information Theory, vol. 55, Issue 2, Feb. 2009, IEEE, pp. 764-775.

Rusek, Fredrik et al., "Non Binary and Precoded Faster Than Nyquist Signaling," IEEE Transactions on Communications, vol. 56, Issue 5, May 2008, IEEE, pp. 808-817.

Saltzberg, Burton R., "Intersymbol Interference Error Bounds with Application to Ideal Bandlimited Signaling," IEEE Transactions on Information Theory, vol. 14, Issue 4, Jul. 1968, IEEE, pp. 563-568.

International Search Report and Written Opinion for International Patent Application No. PCT/EP2015/057371, dated Dec. 7, 2015, 11 pages.

\* cited by examiner

PROCESSING OF A FASTER-THAN-NYQUIST SIGNALING RECEPTION SIGNAL

This application is a 35 U.S.C. § 371 national phase filing of International Application No. PCT/EP2015/057371, filed Apr. 2, 2015, the disclosure of which is incorporated herein by reference in its entirety.

TECHNICAL FIELD

Embodiments presented herein relate to processing of a reception signal, and particularly to a method, a receiver, a computer program, and a computer program product for processing a reception signal

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is bandwidth. The bandwidth limits the information rate of a communication system and is a limited resource, hence it should be used efficiently. For this reason, faster-than-Nyquist (FTN) signaling has attracted interest as it enables a higher data rate (in comparison to schemes not using FTN signaling) without increasing the bandwidth, either by performing spectral compression or by transmitting pulses with a given time-domain shape at a rate that violates Nyquist's intersymbol interference (ISI) criterion. Since the pioneering work by Saltzberg ("Intersymbol interference error bounds with application to ideal bandlimited signaling," IEEE Transactions on Information Theory, vol. 14, no. 4, pp. 563-568, 1968) and by Mazo ("Faster-than-Nyquist signaling," Bell System Technical Journal, vol. 54, no. 8, pp. 1451-1462, 1975) researchers have been investigating the performance limits of FTN and methods for practical implementation.

FTN has traditionally required the use of the Viterbi algorithm for reliable decoding, an approach whose complexity grows exponentially with the number of interfering symbols and polynomially with the number of points in the signal constellation. As an example, decoding a M-PAM (where PAM is short for pulse-amplitude modulation) signal with N symbols and an effect of ISI lasting K symbols results in a computational complexity of $O(N \cdot M^K)$. For large K and/or M this algorithm becomes impractical to be used.

Using the Viterbi algorithm for data decisions in the presence of ISI is thus computationally demanding if the modulation order is high (i.e., the value of M is large) and/or there is ISI interaction between many symbols (i.e., the value of K is large).

In general terms, the task of the receiver is to estimate the transmitted symbols based on the received symbols. Receivers for FTN signaling need to handle both ISI and colored noise (with a different covariance than the ISI). Optimal decoding is known to be a Non-deterministic Polynomial-time hard problem. Further, known mechanisms for decoding of FTN signaling operate on batches, which means that, in order not to lose accuracy, a full block needs to be received until the decoding can begin. Further still, known mechanisms for decoding of FTN signaling require large amounts of storage; to take ISI of length n into account (i.e., ISI affecting n transmitted symbols), $O(n^2)$ matrix elements need to be stored.

Hence, there is a need for an improved processing of a reception signal.

SUMMARY

An object of embodiments herein is to provide efficient processing of a reception signal.

According to a first aspect there is presented a method for processing a reception signal r. The method is performed by a receiver. The method comprises receiving a reception signal r representing a sequence of input symbols $x_n$, the reception signal comprising a sequence of pulse forms gT selected from a set of pulse forms. The method comprises generating a set of decoded symbols $\hat{x}_n$ from the reception symbols by subjecting a set of sampled symbols $y_n$ derived from the reception signal to a whitening filter defined by second coefficients K, and to an equalizer (236) defined by first coefficients R. The first coefficients R and the second coefficients K are selected from respective matrices of a Toeplitz decomposition of a Gram matrix G defined by the inner product of all pulses in the set of pulse forms.

Advantageously this provides efficient processing of a reception signal.

Advantageously this whitens the noise in the reception signal, so that the noise is not correlated between samples during the generation of the set of decoded symbols.

Advantageously this method does not rely on batch-processing and thus allows for a continuous workload during the generation of the set of decoded symbols.

Advantageously this requires only small memory requirements to store the first coefficients and the second coefficients.

According to a second aspect there is presented a receiver for processing a reception signal r. The receiver comprises a processing unit. The processing unit is configured to cause the receiver to receive a reception signal r representing a sequence of input symbols $x_n$, the reception signal comprising a sequence of pulse forms gT selected from a set of pulse forms. The processing unit is configured to cause the receiver to generate a set of decoded symbols $\hat{x}_n$ from the reception symbols by subjecting a set of sampled symbols $y_n$ derived from the reception signal to a whitening filter defined by second coefficients K, and to an equalizer (236) defined by first coefficients R. The first coefficients R and the second coefficients K are selected from respective matrices of a Toeplitz decomposition of a Gram matrix G defined by the inner product of all pulses in the set of pulse forms.

According to a third aspect there is presented a computer program for processing a reception signal r, the computer program comprising computer program code which, when run on a processing unit of a receiver, causes the receiver to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
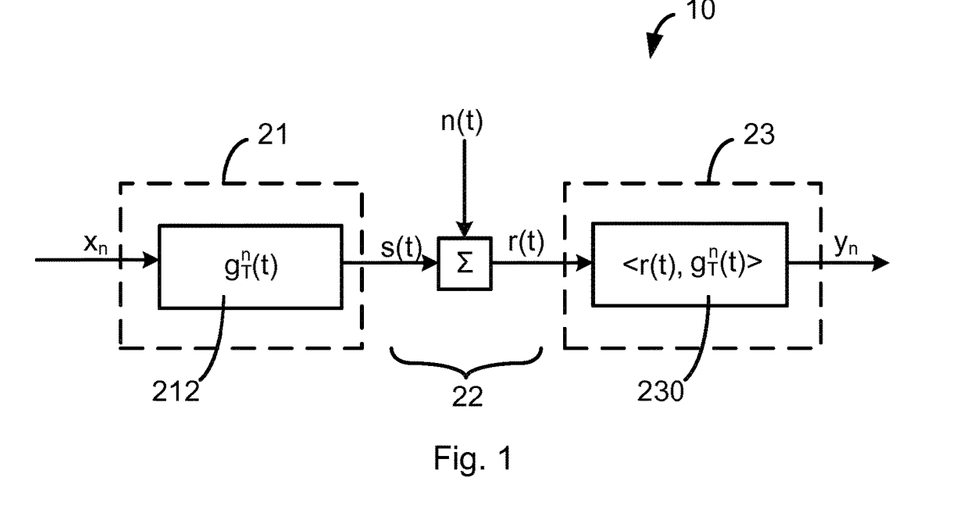
FIG. 1 is a schematic diagram illustrating a communication network according to embodiments.

FIG. 1 is a schematic diagram illustrating a communications network 10. The communications network 10 comprises a transmitter 21 and a receiver 23 separated by a transmission channel 22. The transmitter 21 and/or receiver 23 may be part of a network node or a wireless device. A network node may comprise both a transmitter 21 and a receiver 23 as herein disclosed. However, alternatively, a network node may only comprise one of the herein disclosed transmitter 21 and receiver 23. The network node may be a radio access network node such as a radio base station, a base transceiver station, a node B, or an evolved node B. The network node may also be deployed in fixed point-to-point communication over, e.g., a microwave radio link. A wireless device may comprise both a transmitter 21 and a receiver 23 as herein disclosed. However, alternatively, a wireless device may only comprise one of the herein disclosed transmitter 21 and receiver 23. The wireless device may be a mobile station, a mobile phone, a handset, a wireless local loop phone, a user equipment (UE), a smartphone, a laptop computer, a tablet computer, a sensor, or an Internet-of-things device.

At the transmission channel 22, additive white Gaussian noise (AWGN), denoted n(t), is added to the signal s(t) transmitted by the transmitter 21. Hence, the signal r(t) received by the receiver 23 may be written as r(t)=s(t)+n(t), (in vector notation: r=s+w) where t is a time index, and where n(t) is a continuous stationary stochastic process with zero mean and two-sided power spectral density $N_0/2$ per dimension. In this non-limiting illustrative example the AWGN model has thus been assumed, which is accurate in many scenarios in spite of its simplicity. The symbols an are pulse-shaped in the transmitter 21 by a pulse filter 212 and together form the signal s(t). The pulse filter 212 can be regarded as digital-to-analog converter generating a (physical) transmission signal s(t) based on a set of digital values or symbols $x_n$. Vice versa, the matched filter 230 can be regarded as analog-to-digital converter generating a set of digital values or symbols $y_n$ based on a received (physical) signal r(t).

Root-raised cosine (RRC) pulses enable ISI free transmission provided they are sent with a pulse repetition frequency of 1/T, where T is the inverse symbol rate, and that a matched filter 230 is used in the receiver 23. Other pulse shapes may be used as well, potentially at the cost of some residual ISI after detection, regardless of if FTN is used or not. Sending the RRC pulses at the rate 1/T is known as orthogonal signalling, since the pulses are orthogonal to each other, i.e. the inner product of two different pulses is zero.

Discrete output samples $y_n$ are at the receiver 23 obtained after matched filtering followed by optimal (in the sense that the number of bit errors is minimized) sampling. The process of filtering and sampling is equivalent to calculating the inner products of the signal pulses and the RRC filter:

$$\begin{aligned} y_n &= <r(t), g_T(t-n\cdot T)> \\ &= <s(t), g_T(t-n\cdot T)> + <w(t), g_T(t-n\cdot T)> \\ &= \sum_m x_m <g_T(t-m\cdot T), g_T(t-m\cdot T)> + \eta_n \\ &= x_n + \eta_n, \end{aligned}$$

where n is the index of the n:th symbol, m the index of the m:th sampling instant, where $g_T$ is the RRC pulse shape and $\eta_n$ is zero mean and Gaussian, and where the last equality holds because of orthogonality.

Given the set of samples $y_n$ computed by using a matched filter, the overall transmission problem may be formulated as to estimate a set of symbols $x_n$ from the samples $y_n$ with as low probability of error as possible.

For orthogonal pulses $y_n$ are not affected by ISI and since the noise is white, it is sufficient to consider the amplitude of one symbol at a time to perform maximum likelihood detection of the transmitted bits at the receiver 23.

FTN signaling is accomplished by instead transmitting:

$$s(t) = \sum_n x_n \cdot \sqrt{\rho}\, g_T(t-n\rho T),$$

where $g_T''(t)=\sqrt{\rho}\, g_T(t-n\rho T)$ is the FTN pulse shape, and where $\rho<1$ ($\rho=1$ yields orthogonal pulses). The FTN pulse shape may thus be normalized with the square root of $\rho$ to not increase the power transmitted by the transmitter 21 (the matched filter 230 at the receiver 23 is corrected accordingly). The symbols $x_n$ are taken from some finite alphabet A of symbols.

As a consequence, the pulses are no longer orthogonal (ISI is introduced) and the noise in the receiver 23 becomes correlated. This causes a signal to noise ratio (SNR) penalty in the receiver 23 if data decisions are made on a symbol-by-symbol basis; higher SNR is required to achieve a given bit error rate (BER). The limitation on the FTN parameter ρ which determines the gain in data rate for the FTN signal over orthogonal transmission is $(1+\beta)\rho>1$, where β is the excess bandwidth, for example the roll-off in the RRC pulses. Using β=0 is not possible in practical communications systems. Common values are β=0.1 –0.3. In, e.g., the 3rd Generation Partnership Project (3GGP) telecommunications standards RRC pulses with β=0.22 are used.

The received signal r(t) is by the receiver 23 received and processed using a matched filter, sampled at intervals ρT to yield decoded symbols $y_n$:

$$y_n = \int_{-\infty}^{\infty} r(t) \cdot \sqrt{\rho} g_T(t-n\rho T) dt.$$

Let the matrix G be a matrix depending on the pulse shape used in the communications between the transmitter 21 and the receiver 23:

$$[G]_{m,n} = \int_{-\infty}^{\infty} \sqrt{\rho} \, g_T(t-n\rho T) \cdot \sqrt{\rho} \, g_T(t-m\rho T) dt.$$

Hence the matrix G is a Gram matrix. Then at the receiver 23 the decoded symbols can be written in matrix-vector notation as:

$$y = Gx + G^{1/2} v,$$

where v is time-discrete IID Gaussian noise.

The embodiments disclosed herein relate to processing of a reception signal r. In order to provide such processing there is provided a receiver 23, a method performed by the receiver 23, a computer program comprising code, for example in the form of a computer program product, that when run on a processing unit of the receiver 23, causes the receiver 23 to perform the method.

Here, a receiver is presented that is based on using the (asymptotic) structure of the ISI and the noise covariance. The receiver uses an efficient and memory-inexpensive whitening filter and equalizer.

Figure 2A:
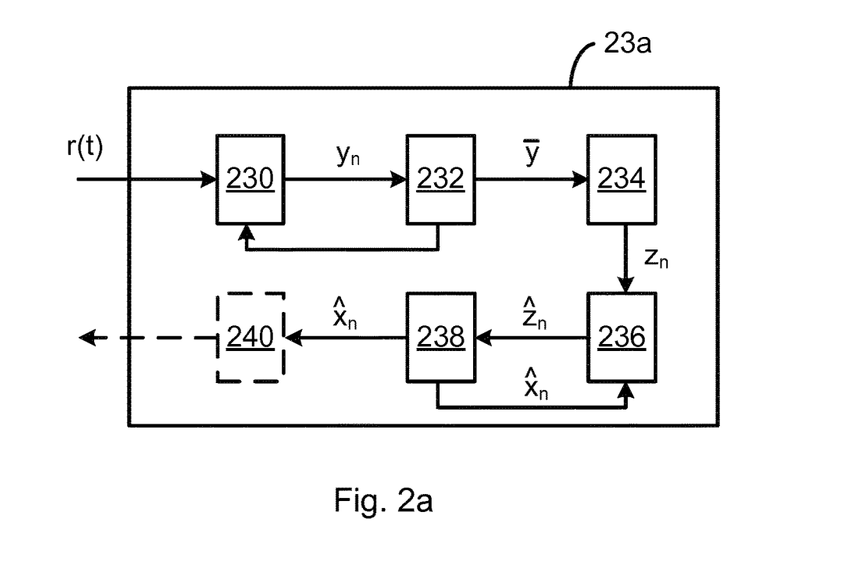
FIGS. 2a and 2b are schematic block diagrams showing a receiver according to embodiments.

FIG. 2a is a schematic block diagram of a receiver 23a according to an embodiment. The receiver 23a comprises a matched filter block 230, a delay block 232, a whitening filter block 234, an equalizer block 236, an estimator block 238, and a further processing block 240 (optional).

Figure 2B:
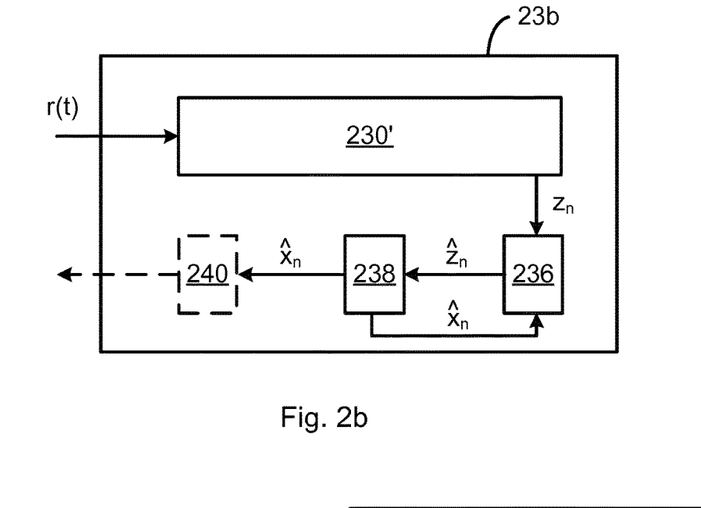

FIG. 2a is a schematic block diagram of a receiver 23b according to another embodiment. The receiver 23b comprises a combined matched whitening filter block 230' (which also may comprise a delay block), an equalizer block 236, an estimator block 238, and a further processing block 240 (optional).

Further details of the receiver 23a, 23b and what functions the blocks 230-240 will be provided below.

Figure 3A:
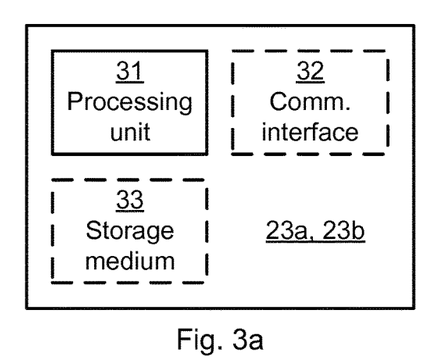
FIG. 3a is a schematic diagram showing functional units of a receiver according to an embodiment.

FIG. 3a schematically illustrates, in terms of a number of functional units, the components of a receiver 23a, 23b according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41 (as in FIG. 4), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The receiver 23a, 23b may further comprise a communications interface 32 for communications with at least one transmitter 21. As such the communications interface 32 may comprise one or more transmitters and receivers, comprising analogue and digital components and a suitable number of antennas for wireless communications and ports for wireline communications. The processing unit 31 controls the general operation of the receiver 23a, 23b e.g. by sending data and control signals to the communications interface 32 and the storage medium 33, by receiving data and reports from the communications interface 33, and by retrieving data and instructions from the storage medium 33. Other components, as well as the related functionality, of the receiver 23a, 23b are omitted in order not to obscure the concepts presented herein.

Figure 3B:
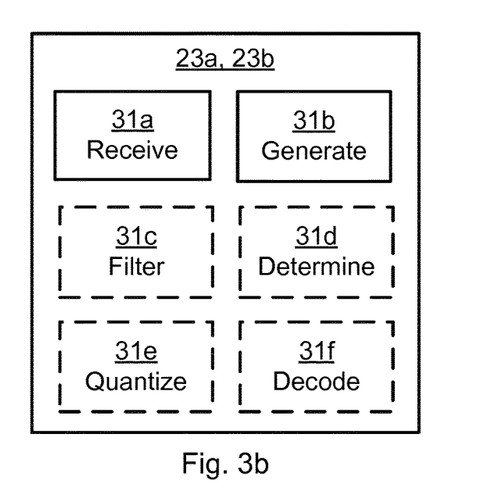
FIG. 3b is a schematic diagram showing functional modules of a receiver according to an embodiment.

FIG. 3b schematically illustrates, in terms of a number of functional modules, the components of a receiver 23a, 23b according to an embodiment. The receiver 23a, 23b of FIG. 3b comprises a number of functional modules; a receive module 31a configured to perform below step S102, and a generate module 31b configured to perform below step S104. The receiver 23a, 23b of FIG. 3b may further comprises a number of optional functional modules, such as any of a filter module 31c configured to perform below step S104s, a determine module 31d configured to perform below step S104b and/or S104c, a quantize module 31e configured to perform below step S104d, and a decode module 31f configured to perform below step S104e. The functionality of each functional module 31a-f will be further disclosed below in the context of which the functional modules 31a-f may be used. In general terms, each functional module 31a-f may be implemented in hardware or in software. Preferably, one or more or all functional modules 31a-f may be implemented by the processing unit 21, possibly in cooperation with functional units 32 and/or 33. The processing unit 31 may thus be arranged to from the storage medium 33 fetch instructions as provided by a functional module 31a-f and to execute these instructions, thereby performing any steps as will be disclosed hereinafter.

The transmitter 21 and/or receiver 23a, 23b may be provided as a standalone device or as a part of a further device. For example, as noted above, the transmitter 21 and/or receiver 23a, 23b may be provided in a network node and/or a wireless device. The transmitter 21 and/or receiver 23a, 23b may be provided as an integral part of the network node and/or wireless device. That is, the components of the transmitter 21 and/or receiver 23a, 23b may be integrated with other components of the network node and/or wireless device; some components of the transmitter 21 and/or receiver 23a, 23b and the network node and/or wireless device may be shared. For example, if the network node and/or wireless device as such comprises a processing unit, this processing unit may be arranged to perform the actions of the processing unit network node and/or wireless device of with the transmitter 21 and/or receiver 23a, 23b. Alternatively the transmitter 21 and/or receiver 23a, 23b may be provided as a separate unit in the network node and/or wireless device.

Figure 4:
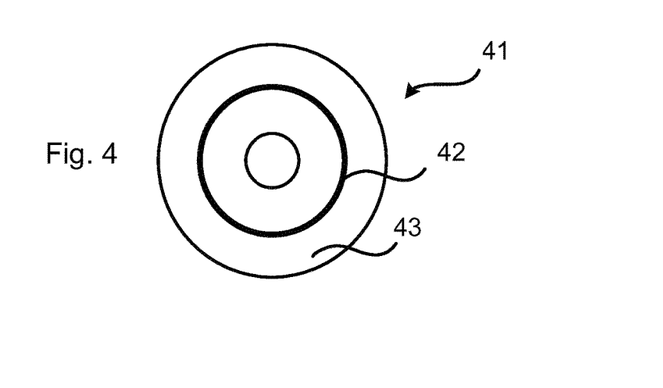
FIG. 4 shows one example of a computer program product comprising computer readable means according to an embodiment.

FIG. 4 shows one example of a computer program product 41 comprising computer readable means 43. On this computer readable means 43, a computer program 43 can be stored, which computer program 43 can cause the processing unit 31 and thereto operatively coupled entities and devices, such as the communications interface 32 and the storage medium 33, to execute methods according to embodiments described herein. The computer program 42 and/or computer program product 41 may thus provide means for performing any steps as herein disclosed.

In the example of FIG. 4, the computer program product 41 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 42 is here schematically shown as a track on the depicted optical disk, the computer program 42 can be stored in any way which is suitable for the computer program product 41.

Figure 5:
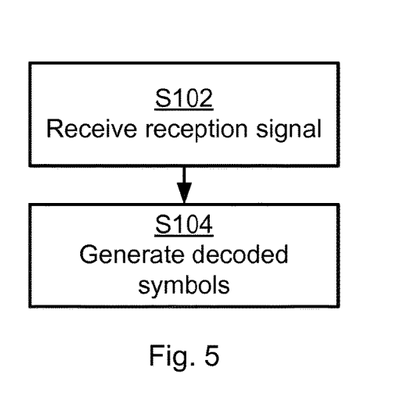
FIGS. 5 and 6 are flowcharts of methods according to embodiments.
Figure 6:
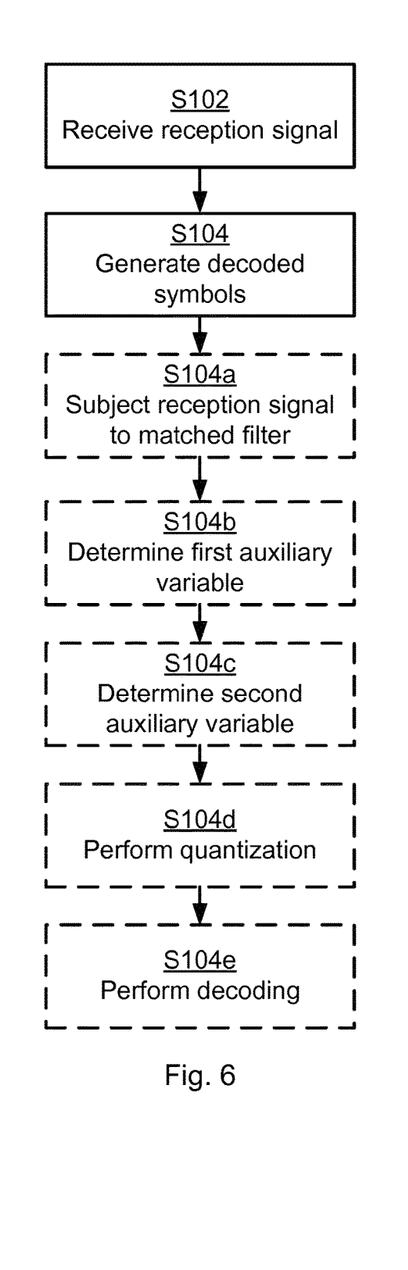

FIGS. 5 and 6 are flow chart illustrating embodiments of methods for processing a reception signal r. The methods are performed by the receiver 23a, 23b. The methods are advantageously provided as computer programs 42.

Reference is now made to FIG. 5 illustrating a method for processing a reception signal ras performed by the receiver 23a, 23b according to an embodiment.

It is assumed that the receiver 23a, 23b receives a signal to process. Since the signal is to be processed by the receiver 23a, 23b it is denoted a reception signal r. Hence, the receiver 23a, 23b is configured to, in a step S102, receive a reception signal r. The reception signal rrepresents a sequence of input symbols $x_n$. The reception signal rcomprises a sequence of pulse forms gT selected from a set of pulse forms.

The receiver 23a, 23b processes the reception signal rin order to obtain a set of decoded symbols $\hat{x}_n$. Particularly, the receiver 23a, 23b is configured to, on a step S104, generate a set of decoded symbols $\hat{x}_n$ from the reception symbols. The set of decoded symbols $\hat{x}_n$ are generated by the receiver 23a, 23b subjecting a set of sampled symbols $y_n$ derived from the reception signal to a whitening filter 230', 234 and to an equalizer 236. The whitening filter 230', 234 is defined by second coefficients K. The equalizer 236 is defined by first coefficients R. The first coefficients R and the second coefficients K are selected from respective matrices of a Toeplitz decomposition of a Gram matrix G. The Gram matrix is defined by the inner product of all pulses in the set of pulse forms.

Embodiments relating to further details of processing a reception signal rwill now be disclosed.

There may be different ways to select the first coefficients R and the second coefficients K. Different embodiments relating thereto will now be described in turn.

For example, recall from above that $$y=Gx+G^{1/2}v,$$

The matrix G is a symmetric Toeplitz matrix. For every finite size it is positive definite. Using Cholesky decomposition (or factorization; these terms can be used interchangeably) this expression can be re-written as:

$$y=L^T Lx+L^T v,$$

where L is a lower triangular Cholesky factor. Whitening the noise by multiplying with $L^{-T}$ yields:

$$z=L^{-T}y=Lx+v,$$

which is one suitable form for decision feedback equalization since the latter symbols do not affect the earlier samples in z (since L is lower triangular). Thus, it is possible to start with $z_1$ and use it to calculate the estimate $\hat{x}_1$ of the transmitted symbol $x_1$, then subtract the interference caused by $x_1$ on $x_2$ under the assumption that the estimate is correct (i.e., that $\hat{x}_1 = x_1$).

According to an embodiment the first coefficients R are selected from a first triangular matrix L. For example, L can be written as follows:

$$L = \begin{bmatrix} l_{1,1} & 0 & 0 & \cdots & \cdots & \cdots & 0 \\ l_{2,1} & l_{2,2} & 0 & \cdots & \cdots & \cdots & 0 \\ l_{3,1} & l_{3,2} & l_{3,3} & \cdots & \cdots & \cdots & 0 \\ \vdots & \vdots & \vdots & \ddots & \cdots & \cdots & \vdots \\ l_{m,1} & l_{m,2} & l_{m,3} & \cdots & l_{m,m} & \cdots & 0 \\ \vdots & \vdots & \vdots & \vdots & \vdots & \ddots & \vdots \\ l_{M,1} & l_{M,2} & l_{M,3} & \cdots & \cdots & \cdots & l_{M,M} \end{bmatrix}$$

According to an embodiment the second coefficients K are selected from a second triangular matrix $L^{-T}$. For example, $L^{-T}$ can be written as follows:

$$L^{-T} = \begin{bmatrix} q_{1,1} & q_{1,2} & q_{1,3} & \cdots & \cdots & \cdots & q_{1,M} \\ 0 & q_{2,2} & q_{2,3} & \cdots & \cdots & \cdots & a_{2,M} \\ 0 & 0 & l_{3,3} & \cdots & \cdots & \cdots & a_{3,M} \\ \vdots & \vdots & \vdots & \ddots & \cdots & \cdots & \vdots \\ 0 & 0 & 0 & \cdots & q_{m,m} & \cdots & q_{m,M} \\ \vdots & \vdots & \vdots & \vdots & \vdots & \ddots & \vdots \\ 0 & 0 & 0 & \cdots & \cdots & \cdots & q_{M,M} \end{bmatrix}$$

According to an embodiment the first triangular matrix L and the second triangular matrix $L^{-T}$ are determined such that $L L^T = G$, and $L^{-T} = (L^T)^{-1}$ such that $L^{-T}L^T = I$, where I is an identity matrix.

The matrix L is asymptotically Toeplitz for a large enough block size (as $M \to \infty$). This in turn also means that $L^T$, and $L^{-T}$ are also Toeplitz matrices. Thus, $L^T$ and $L^{-T}$ are, asymptotically, described by only one row.

Therefore, according to one embodiment the first coefficients R are defined by a vector in the first triangular matrix L. Hence, according to this embodiment the first coefficients R are defined as a vector containing the r elements to the left/below the diagonal in L, excluding the diagonal element:

$$R = [l_{m,m-r}, l_{m,m-r+1}, \ldots, l_{m,m-2}, l_{m,m-1}]^T$$

Correspondingly, according to one embodiment, the second coefficients K are defined by a vector in $L^{-T}$. Hence, according to this embodiment the second coefficients K are defined as a vector containing the k elements to the right/above the diagonal in $L^{-T}$, including the diagonal element:

$$K = [q_{m,m}, q_{m,m+1}, \ldots, q_{m,m+k-2}, q_{m,m+k-1}]^T$$

It may further be possible that the first coefficients R include less than all non-zero elements in a row or column of the first triangular matrix L. Also, the second coefficients K may include less than all non-zero elements in a row or column of the second triangular matrix $L^{-T}$.

There may be different ways to select the first coefficients R from L and the second coefficients K from $L^{-T}$. For example, the first coefficients R may not include a diagonal element of the first triangular matrix L. Hence, if the first coefficients R are selected as a vector in L, the vector may not include the element $l_{i,i}$, for all i=1, ..., M. Correspondingly, the second coefficients K may include a diagonal element of the second triangular matrix $L^{-T}$. Hence, if the second coefficients K are selected as a vector in $L^{-T}$, the vector may include one of the elements $q_{i,i}$, for i=1, ..., M. A set of non-consecutive values in L and $L^{-T}$ may be selected as R and K, for example by skipping values in L and $L^{-T}$ that are smaller than some criterion.

As disclosed above, the first triangular matrix L may be a lower triangular Cholesky factor of the Gram matrix G. However, alternatively, the first triangular matrix L may be an upper triangular matrix of a QR decomposition or a Cholesky decomposition of the Gram matrix G. Yet alternatively, the first triangular matrix L may be a lower triangular matrix of a QR decomposition or a Cholesky decomposition of the Gram matrix G. Further, the second matrix $L^{-T}$ may be the inverse of a unitary matrix of a QR decomposition or a Cholesky decomposition of the Gram matrix G. Alternatively, the second triangular matrix $L^{-T}$ may be the inverse of the conjugate transpose of a Cholesky factor of the Gram matrix G.

However, $L^{-T}$ needs not to be triangular. Having $L^{-T}$ triangular may be advantageous in terms of complexity and memory requirements.

There may be different ways to determine when to define first coefficients R and the second coefficients K. For example, the first coefficients R an the second coefficients K can be precomputed and stored in the receiver 23a, 23b, as long as the same pulses are used and the radio conditions are the same.

For a finite size of the matrix G, the matrix L is, as noted above, not Toeplitz due to edge effects. Nonetheless, the "middle" of the matrix will converge to have a Toeplitz character even for moderate sizes, such as 100-by-100 elements. This is true for elements in the matrix close to the main diagonal of the matrix G.

For practical implementation the matrix G may be truncated, and hence the ISI taken into account. We essentially need to band the matrices L and $L^{-T}$. Normally the ISI will decay quickly, so only a few samples of L is needed. For $L^{-T}$ the situation is a bit different. Since L decays quickly, $L^{-T}$ does typically not decrease so fast.

There may be different ways to determine how many elements to have in first coefficients R and in the second coefficients K. For example, the second coefficients K comprise more elements than the first coefficients R. According to an embodiment, the number of elements in the first coefficients R is determined such that a difference (such as max(|R|)−min(|R|)) and/or quotient (such as min(|R|)/max(|R|)) between the element in the first coefficients R with largest absolute value and the element in the first coefficients R with smallest absolute value is within a predefined range. Further, according to an embodiment, the number of elements in the second coefficients K is determined such that a difference between the element in the second coefficients K with largest absolute value and the element in the second coefficients K with smallest absolute value is within a predefined range. Thereby the absolute value of the largest among the non-chosen values is sufficiently small in comparison to the largest chosen value. Thereby the sum of the absolute values of the non-chosen values is sufficiently small, in comparison to either the largest value, and/or the sum absolute values of the chosen values. In summary, the number of elements in the first coefficients R and the number of elements in the second coefficients K may be determined so as to have enough energy compared to the coefficients not selected.

As an illustrative example assume a matrix G of size 500-by-500 elements and a transmitted signal using a root-raised cosine pulse with a roll-off factor 0.3, and ρ=0.8. The matrices L and $L^{-T}$ are determined and m=250 is selected.

For L we have $|l_{m,m-4}|=0.0234$, and $|l_{m,m-n}|<0.01$ for all n>4. This implies that the 5:th element off the diagonal in L has an absolute value of 0.0234 and this is the last element that is not below 0.01.

For $L^{-T}$ in the same setting we have $|q_{m,m+32}|=0.0107$, and $|q_{m,m+n}|<0.01$ for all n>32. This implies that the 33:rd element is the last element that has a magnitude above 0.01. However, keeping only 15 elements the largest elements a $|q_{m,m+14}|=0.0941$ are captured.

Reference is now made to FIG. 6 illustrating methods for processing a reception signal ras performed by the receiver 23a, 23b according to further embodiments.

There may be different ways to derive the set of sampled symbols $y_n$ from the reception symbols. For example, the receiver 23a, 23b may be configured to, in an optional step S104a, derive the set of sampled symbols $y_n$ from the reception symbols by subjecting the reception signal r to a matched receiver filter 230, 230'.

The matched filter may be combined with the whitening filter. This may require the determination of coefficients of a combined matched whitening filter. Hence, according to an embodiment the whitening filter is combined with the matched receiver filter into a combined matched whitening receiver filter 230', where the combined receiver filter use a pulse shape based on the set of pulse forms gT and on the second coefficients K. The coefficients of the combined matched whitening filter may thus be determined as:

$$f^n(t) = K^T \begin{bmatrix} g_T^n(t) \\ g_T^{n+1}(t) \\ \vdots \\ g_T^{n+k-2}(t) \\ g_T^{n+k-2}(t) \end{bmatrix},$$

where $f^n$ (t) are the new coefficients. That is, the coefficients $f^n$ (t) replace the coefficients $g_T^n$ (t) in the matched filter 230. This would allow for skipping an explicit whitening step and applying the processing directly to the received (and sampled) signal.

Alternatively, the set of sampled symbols are subjected to the whitening filter prior to being subjected to the equalizer.

There may be different ways to subject the set of sampled symbols to the whitening filter. According to an embodiment, the receiver 23a, 23b is configured to, in a step S104b, subject the set of sampled symbols to the whitening filter by performing a first coefficients operation involving determining a first auxiliary variable $z_n$ such that $z_n$=K y. In more detail, during reception one objective is to determine $\hat{x}_n$ which is the estimate of $x_n$, the n:th element of the transmitted symbols. To accomplish this, sampling is made k−1 samples ahead, and then the first auxiliary variable $z_n$ may be determined as:

$$z_n = K^T \begin{bmatrix} y_n \\ y_{n+1} \\ \vdots \\ y_{n+k-2} \\ y_{n+k-1} \end{bmatrix}.$$

This will whiten the noise and is (almost, except for the truncation) equivalent with one row in the $L^{-T}$ multiplication.

As noted above, the second coefficients may comprise selected non-consecutive values. If so, also the selected y-values should be non-consecutive, and take values in the corresponding pattern.

According to an embodiment, subjecting the set of sampled symbols to the equalizer comprises, in a step S104c, performing (S104c) a second coefficients operation involving determining a second auxiliary variable $\hat{z}_n$ such that $\hat{z}_n = z_n - R \hat{x}_n$. Using the r stored and previously estimated values $\hat{x}_{n-r+1}, \hat{x}_{n-r+2}, \ldots \hat{x}_{n-2}, \hat{x}_{n-1}$, the second auxiliary variable may be determined as:

$$\hat{z}_n = z_n - R^T \begin{bmatrix} \hat{x}_{n-r} \\ \hat{x}_{n-r+1} \\ \vdots \\ \hat{x}_{n-2} \\ \hat{x}_{n-1} \end{bmatrix}.$$

The values $\hat{z}_n$ can be used to estimate $\hat{x}_n$. This works since:

$$\hat{z}_n = x_n + v_n,$$

where $v_n$ is white Gaussian noise, assuming that the truncation has negligible impact and that the previously estimated values $\hat{x}$ are indeed equal to the transmitted symbols. As an example, for binary PAM, the the sign of $\hat{z}_n$ can be observed to decide if $\hat{x}_n = \pm 1$. Particularly, generating the set of decoded symbols may involve the receiver 23a, 23b to, in a step S104d, perform a quantization operation on the second auxiliary variable $\hat{z}_n$. Additionally or alternatively, generating the set of decoded symbols may involve the receiver 23a, 23b to, in a step S104e, perform turbo decoding of a sequence of the second auxiliary variables $\hat{z}_n$. For example, the outputted variables $\hat{z}_n$ can be used as input softbits to the turbo decoder.

There may be different types of equalizer to be used in the receiver 23a, 23b. For example, the equalizer may be a decision feedback equalizer.

The pulse forms in the sequence of pulse forms gT may be separated by a time distance $\rho T$, where T is an intermediate time for orthogonal pulse transmission with respect to the pulse form gT, and $0 < \rho < 1$ is a scale factor. Further, the inner product may be calculated at integer multiples of $\pm \rho T$. The scale factor $\rho$ may be determined such as the relation $(1+\beta)\rho > 1$ holds. Having $(1+\beta) \rho > 1$ yields stability. More generally, the parameter $\beta$ may be defined as the roll-off of the pulse that is orthogonal for time shifts T, but that has a spectrum the size of $(1+\beta)*2/T$ with roll-off $\beta$. There are different values of $\beta$ that may be used. One example is to use $0.1 < \beta < 0.3$, but also values of $\beta$ outside this interval, such as for root-raised-cosine shaped pulses where $0 < \beta < 1$, may be used. According to an embodiment $\beta = 0.22$.

Figure 7:
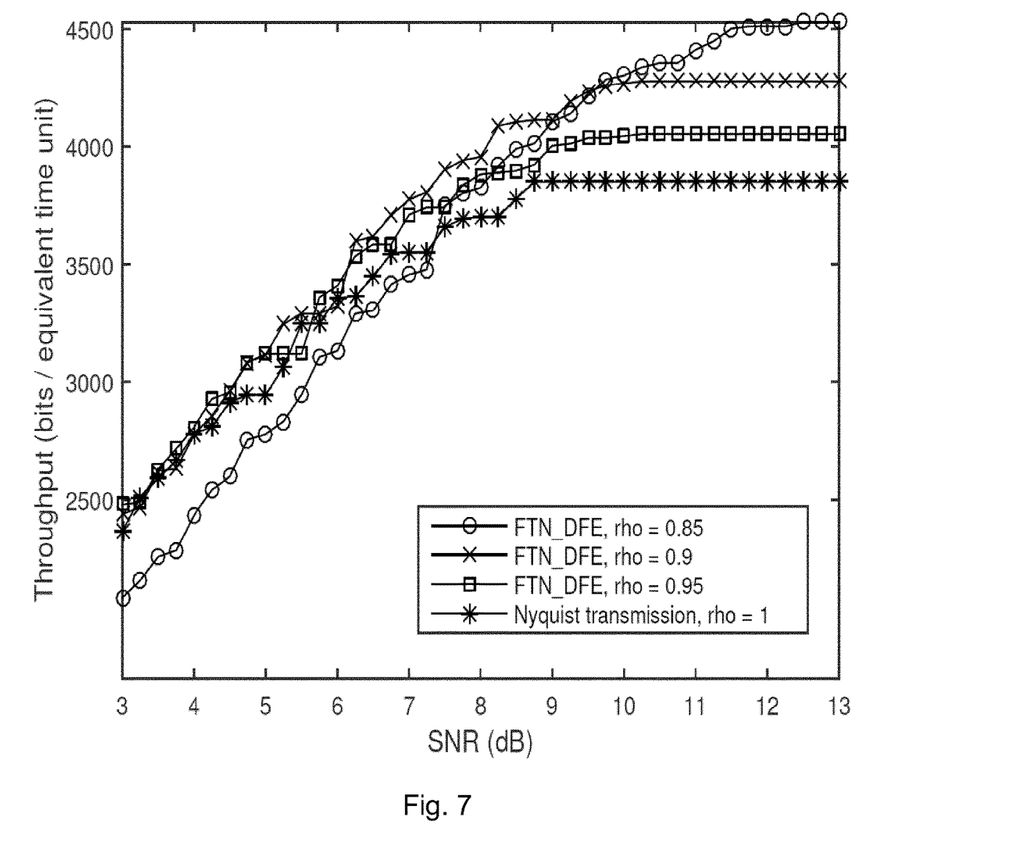
FIG. 7 schematically illustrates simulation results according to an embodiment.

FIG. 7 shows simulation results, denoted "FTN_DFE", in terms of throughput (bits per equivalent time unit) as a function of signal to noise ration (SNR) in dB where turbo coding has been applied in addition to the herein disclosed processing of the reception signal (i.e., processing by a whitening filter and an equalizer) for different values of $\rho$ (expressed as "rho" in FIG. 7). The simulation results show that decoding does not necessarily need to involve quantization.

In summary, according to some of the embodiments disclosed herein there has been presented mechanisms for processing a reception signal, using FTN signaling or other non-orthogonal signaling, based on a whitening filter and an equalizer, for example provided by a decision feedback equalizer. The whitening filter and the equalizer use the (asymptotic) structure of the Gram matrix G (i.e., without relying on matrix-vector multiplications and batch processing) that makes them efficient and memory-inexpensive but still providing accurate estimations.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for processing a reception signal r, the method being performed by a receiver, the method comprising:
   receiving a reception signal r representing a sequence of input symbols $x_n$, the reception signal comprising a sequence of pulse forms gT selected from a set of pulse forms; and
   generating a set of decoded symbols $\hat{x}_n$ from the reception symbols by subjecting a set of sampled symbols $y_n$, derived from the reception signal to a whitening filter defined by second coefficients K, and to an equalizer defined by first coefficients R, wherein the first coefficients R and the second coefficients K are selected from respective matrices of a Toeplitz decomposition of a Gram matrix G defined by an inner product of all pulses in the set of pulse forms, wherein a number of elements in the first coefficients R are determined such that a difference between the element in the first coefficients R with a largest absolute value and the element in the first coefficients R with a smallest absolute value is within a predefined range.

2. The method according to claim 1, wherein the set of sampled symbols $y_n$ are derived from the reception symbols by:
   subjecting the reception signal r to a matched receiver filter.

3. The method according to claim 2, wherein said whitening filter is combined with said matched receiver filter into a combined matched whitening receiver filter, the combined matched whitening receiver filter using a pulse shape based on the set of pulse forms gT and on the second coefficients K.

4. The method according to claim 1, wherein the set of sampled symbols are subjected to the whitening filter prior to being subjected to the equalizer.

5. The method according to claim 1, wherein subjecting the set of sampled symbols to the whitening filter comprises:
   performing a first coefficients operation involving determining a first auxiliary variable $z_n$ such that $z_n = K$ y.

6. The method according to claim 5, wherein subjecting the set of sampled symbols to the equalizer comprises:
performing a second coefficients operation involving determining a second auxiliary variable $\hat{z}_n$ such that $\hat{z}_n = z_n - R\hat{x}_n$.

7. The method according to claim 1, wherein generating the set of decoded symbols comprises:
performing a quantization operation on a second auxiliary variable $\hat{z}_n$.

8. The method according to claim 1, wherein generating the set of decoded symbols comprises:
performing turbo decoding of a sequence of second auxiliary variables $\hat{z}_n$.

9. The method according to claim 1, wherein the first coefficients R are selected from a first triangular matrix L.

10. The method according to claim 1, wherein the first coefficients R are defined by a vector in a first triangular matrix L.

11. The method according to claim 1, wherein the first coefficients R include less than all non-zero elements in a row or column of a first triangular matrix L.

12. The method according to claim 1, wherein the first coefficients R do not include a diagonal element of a first triangular matrix L.

13. The method according to claim 1, wherein a first triangular matrix L is a lower triangular Cholesky factor of the Gram matrix G.

14. The method according to claim 1, wherein a first triangular matrix L is an upper triangular matrix of a QR decomposition or a Cholesky decomposition of the Gram matrix G.

15. The method according to claim 1, wherein a first triangular matrix L is a lower triangular matrix of a QR decomposition or a Cholesky decomposition of the Gram matrix G.

16. The method according to claim 1, wherein the second coefficients K are selected from a second triangular matrix $L^{-T}$.

17. The method according to claim 1, wherein the second coefficients K are defined by a vector in $L^{-T}$.

18. The method according to claim 16, wherein the second coefficients K include less than all non-zero elements in a row or column of the second triangular matrix $L^{-T}$.

19. The method according to claim 16, wherein the second coefficients K include a diagonal element of the second triangular matrix $L^{-T}$.

20. The method according to claim 1, wherein a second triangular matrix $L^{-T}$ is the inverse of a unitary matrix of a QR decomposition or a Cholesky decomposition of the Gram matrix G.

21. The method according to claim 1, wherein a second triangular matrix $L^{-T}$ is the inverse of a conjugate transpose of a Cholesky factor of the Gram matrix G.

22. The method according to claim 1, wherein a first triangular matrix L and a second triangular matrix $L^{-T}$ are determined such that $LL^T = G$, and $L^{-T} = (L^T)^{-1}$ such that $L^{-T}L^T = I$, where I is an identity matrix.

23. The method according to claim 1, wherein the second coefficients K comprise more elements than the first coefficients R.

24. The method according to claim 1, wherein the equalizer is a decision feedback equalizer.

25. A method for processing a reception signal r, the method being performed by a receiver, the method comprising:
receiving a reception signal r representing a sequence of input symbols $x_n$, the reception signal comprising a sequence of pulse forms gT selected from a set of pulse forms; and
generating a set of decoded symbols $\hat{x}_n$ from the reception symbols by subjecting a set of sampled symbols $y_n$ derived from the reception signal to a whitening filter defined by second coefficients K, and to an equalizer defined by first coefficients R, wherein the first coefficients R and the second coefficients K are selected from respective matrices of a Toeplitz decomposition of a Gram matrix G defined by an inner product of all pulses in the set of pulse forms, wherein a number of elements in the second coefficients K is determined such that a difference between the element in the second coefficients K with a largest absolute value and the element in the second coefficients K with a smallest absolute value is within a predefined range.

26. A method for processing a reception signal r, the method being performed by a receiver, the method comprising:
receiving a reception signal r representing a sequence of input symbols $x_n$, the reception signal comprising a sequence of pulse forms gT selected from a set of pulse forms; and
generating a set of decoded symbols $\hat{x}_n$ from the reception symbols by subjecting a set of sampled symbols $y_n$ derived from the reception signal to a whitening filter defined by second coefficients K, and to an equalizer defined by first coefficients R, wherein the first coefficients R and the second coefficients K are selected from respective matrices of a Toeplitz decomposition of a Gram matrix G defined by an inner product of all pulses in the set of pulse forms, wherein the inner product is calculated at integer multiples of $\pm \rho T$, where T is an intermediate time for orthogonal pulse transmission with respect to the pulse form gT, and $0 < \rho < 1$ is a scale factor.

27. A method for processing a reception signal r, the method being performed by a receiver, the method comprising:
receiving a reception signal r representing a sequence of input symbols $x_n$, the reception signal comprising a sequence of pulse forms gT selected from a set of pulse forms; and
generating a set of decoded symbols $\hat{x}_n$ from the reception symbols by subjecting a set of sampled symbols $y_n$ derived from the reception signal to a whitening filter defined by second coefficients K, and to an equalizer defined by first coefficients R, wherein the first coefficients R and the second coefficients K are selected from respective matrices of a Toeplitz decomposition of a Gram matrix G defined by an inner product of all pulses in the set of pulse forms, wherein pulse forms in the sequence of pulse forms are separated by a time distance $\rho T$, where T is an intermediate time for orthogonal pulse transmission with respect to the pulse form gT, and $0 < \rho < 1$ is a scale factor.

28. The method according to claim 27, wherein $\rho$ is determined such as $(1+\beta)\rho > 1$, where $0 < \beta < 1$.

29. The method according to claim 28, wherein $\beta = 0.22$.

30. A receiver for processing a reception signal r, the receiver comprising a processing unit, the processing unit being configured to cause the receiver to:

receive a reception signal r representing a sequence of input symbols $x_n$, the reception signal comprising a sequence of pulse forms gT selected from a set of pulse forms; and generate a set of decoded symbols $\hat{x}_n$ from the reception symbols by subjecting a set of sampled symbols $y_n$ derived from the reception signal to a whitening filter defined by second coefficients K, and to an equalizer defined by first coefficients R, wherein the first coefficients R and the second coefficients K are selected from respective matrices of a Toeplitz decomposition of a Gram matrix G defined by an inner product of all pulses in the set of pulse forms, wherein a number of elements in the first coefficients R is determined such that a difference between the element in the first coefficients R with a largest absolute value and the element in the first coefficients R with a smallest absolute value is within a predefined range.

31. A computer program product stored on a non-transitory computer readable means, the computer program product for processing a reception signal r, the computer program product comprising computer code which, when run on a processing unit of a receiver, causes the receiver to:

receive a reception signal r representing a sequence of input symbols $x_n$, the reception signal comprising a sequence of pulse forms gT selected from a set of pulse forms; and generate a set of decoded symbols $\hat{x}_n$ from the reception symbols by subjecting a set of sampled symbols $y_n$ derived from the reception signal to a whitening filter defined by second coefficients K, and to an equalizer defined by first coefficients R, wherein the first coefficients R and the second coefficients K are selected from respective matrices of a Toeplitz decomposition of a Gram matrix G defined by an inner product of all pulses in the set of pulse forms, wherein a number of elements in the first coefficients R is determined such that a difference between the element in the first coefficients R with a largest absolute value and the element in the first coefficients R with a smallest absolute value is within a predefined range.

* * * * *